(12) United States Patent
Gross et al.

(10) Patent No.: US 7,482,946 B2
(45) Date of Patent: Jan. 27, 2009

(54) METHOD AND APPARATUS FOR CAMOUFLAGING BUSINESS-ACTIVITY INFORMATION IN A TELEMETRY SIGNAL

(75) Inventors: Kenny C. Gross, San Diego, CA (US); Jon D. Greaves, Longmont, CO (US); Keith A. Whisnant, LaJolla, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 424 days.

(21) Appl. No.: 11/471,203

(22) Filed: Jun. 20, 2006

(65) Prior Publication Data

US 2008/0001776 A1    Jan. 3, 2008

(51) Int. Cl.
*H04K 3/00*    (2006.01)
(52) U.S. Cl. .................. 340/870.01; 380/1; 380/252; 380/254
(58) Field of Classification Search .......... 380/1, 380/206, 207, 252–255, 268, 210; 340/870.01
See application file for complete search history.

(56) References Cited

U.S. PATENT DOCUMENTS 5,297,201 A * 3/1994 Dunlavy ................. 380/252

\* cited by examiner

*Primary Examiner*—Albert K Wong
*Assistant Examiner*—Hung Q Dang
(74) *Attorney, Agent, or Firm*—Park, Vaughan & Fleming LLP

(57) ABSTRACT

One embodiment of the present invention provides a system that camouflages business-activity information in telemetry signals from a computer system. During operation, the system monitors telemetry signals from the computer system to obtain a time series containing a telemetry metric which provides business-activity information. Next, for each telemetry-metric value contained in the time series, the system compares the telemetry-metric value with a predetermined threshold level. If the telemetry-metric value is below the predetermined threshold level, the system then generates artificial activity associated with the telemetry metric in the computer system, so that the artificial activity causes the telemetry-metric value to exceed the predetermined threshold level.

18 Claims, 2 Drawing Sheets

REAL-TIME TELEMETRY SYSTEM 100

METHOD AND APPARATUS FOR CAMOUFLAGING BUSINESS-ACTIVITY INFORMATION IN A TELEMETRY SIGNAL

RELATED APPLICATION

The subject matter of this application is related to the subject matter in a co-pending non-provisional application by the same inventors as the instant application and filed on the same day as the instant application entitled, "Camouflaging Business-Activity Information in a Telemetry Signal Through Randomization," having Ser. No. 11/471,204, and filing date Jun. 20, 2006.

BACKGROUND

1. Field of the Invention

The present invention relates to techniques for camouflaging business-activity information in telemetry signals from a computer system. More specifically, the present invention relates to a method and an apparatus that monitors telemetry signals and generates artificial activity in a computer system to camouflage business-activity information in the telemetry signals.

2. Related Art

Modern server systems are typically equipped with a significant number of sensors which monitor signals during the operation of the server systems. For example, these monitored signals can include temperatures, voltages, currents, and a variety of software performance metrics, including CPU usage, I/O traffic, and memory utilization. Outputs from this monitoring process can be used to generate time series data for these signals which can subsequently be analyzed to determine how well a computer system is operating.

However, some telemetry signals gathered from certain enterprise servers may contain business-activity information, which a company would not want its competitors or unauthorized persons to learn. More specifically, by looking at these telemetry time series traces, it is possible to discover the level of a company's business activities and to infer company's business performance well before the company's CFO even knows how the company is doing.

For example, an enterprise server which executes business transactions for a company, such as the company's booking, billing and shipping transactions, can generate a variety of telemetry signals which contain operating-system-related metrics such as load on CPU, throughput, I/O traffic, and response times. These telemetry signals have been shown to exhibit similar dynamic profiles including: (1) five large daily humps during typical business weeks with low troughs at nights and on weekends; (2) growing peak heights through a quarter; and (3) lower peak heights at the beginning of a new quarter (well-known "hockey stick" profiles from business metrics).

Such business dynamics show up in the telemetry time series because business activities are often reflected in the above-described operating system related metrics, which can be directly or indirectly obtained from the associated telemetry signals.

Even though none of company's sensitive information is accessible through such telemetry data, the fact that some of the telemetry time series dynamics reflect a company's level of business activity may create potentially serious business risks. For example, if this information falls into the wrong hands and is misused for financial gain, it could result in people going to jail and/or monetary damages to the company's business.

Although some telemetry signals can be extremely business-sensitive, these signals have not been generally considered to be confidential information. Consequently, such information can easily fall into the wrong hands, such as persons seeking financial gain in trading markets. Such persons, who can access this telemetry data, can come from both inside and outside of a company. For example, they can include employees, contractors, partners, interns, and hackers. Therefore, it is highly desirable to restrict access to this information by providing added business security to the telemetry signals.

Hence, what is need is a method and apparatus for effectively camouflaging business-activity information in telemetry data without the above-described problems.

SUMMARY

One embodiment of the present invention provides a system that camouflages business-activity information in telemetry signals from a computer system. During operation, the system monitors telemetry signals from the computer system to obtain a time series containing a telemetry metric which provides business-activity information. Next, for each telemetry-metric value contained in the time series, the system compares the telemetry-metric value with a predetermined threshold level. If the telemetry-metric value is below the predetermined threshold level, the system then generates artificial activity associated with the telemetry metric in the computer system, so that the artificial activity causes the telemetry-metric value to exceed the predetermined threshold level.

In a variation on this embodiment, the telemetry metric can include: (1) load on a CPU; (2) I/O traffic; (3) memory utilization; and (4) storage read/write activity.

In a variation on this embodiment, the system generates the artificial activity associated with the telemetry metric which causes the telemetry-metric value to increase to a predetermined constant value.

In a variation on this embodiment, the system generates the artificial activity by running exerciser code on the computer system at a low-priority level.

In a further variation on this embodiment, the system halts the execution of the exerciser code when user activity is detected.

In a variation on this embodiment, the system performs the camouflaging operation in a feedback and control loop.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Real-Time Telemetry System

Figure 1:
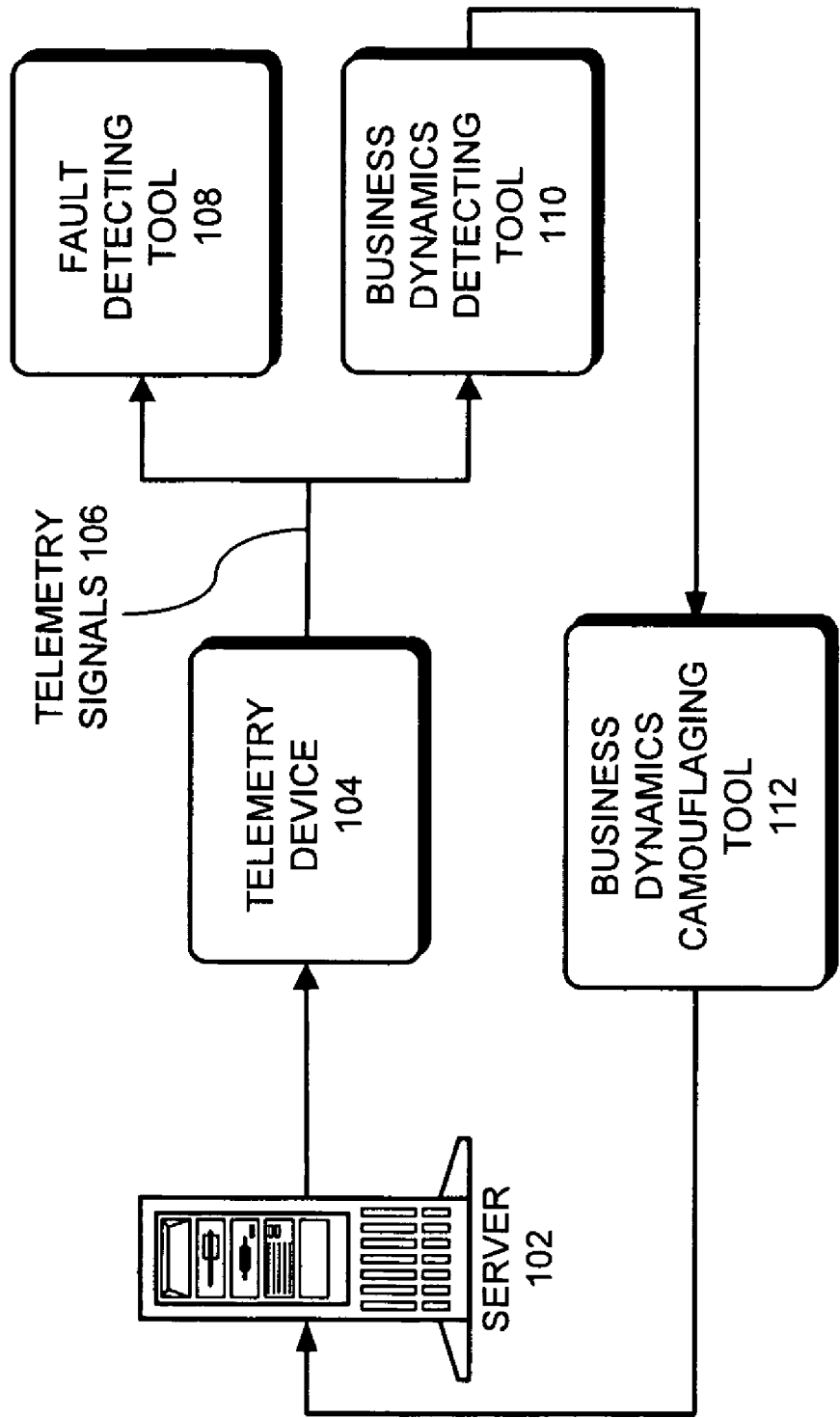
FIG. 1 illustrates a real-time telemetry system which facilitates camouflaging business-activity information in the telemetry signals in accordance with an embodiment of the present invention.

FIG. 1 illustrates real-time telemetry system 100 which facilitates camouflaging business-activity information in the telemetry signals in accordance with an embodiment of the present invention. Real-time telemetry system 100 contains server 102. Server 102 can generally include any computational node including a mechanism for servicing requests from a client for computational and/or data storage resources. In the present embodiment, server 102 is a uniprocessor or multiprocessor server that is being monitored by real-time telemetry system 100.

Note that the present invention is not limited to the computer server system illustrated in FIG. 1. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

Real-time telemetry system 100 also contains telemetry device 104, which gathers telemetry signals 106 from the various sensors and monitoring tools within server 102, and directs telemetry signals 106 to a local or a remote location that contains fault-detecting tool 108 and business-dynamic-detection tool 110.

Note that telemetry signals 106 gathered by real-time telemetry system 104 can include signals associated with physical and/or software performance parameters measured through sensors within the computer system. The physical parameters can include, but are not limited to: distributed temperatures within the computer system, relative humidity, cumulative or differential vibrations within the computer system, fan speed, acoustic signals, currents, voltages, time-domain reflectometry (TDR) readings, and miscellaneous environmental variables. The software parameters can include, but are not limited to: load metrics, CPU utilization, I/O traffic, idle time, memory utilization, disk activity, transaction latencies, and other performance metrics reported by the operating system.

Fault-detecting tool 108 monitors and analyzes telemetry signals 106 in real-time. Specifically, fault-detecting tool 108 detects anomalies in telemetry signals 106 and by analyzing telemetry signals 106, predicts probabilities of specific faults and failures in server 102. In one embodiment of the present invention, telemetry device 104 and fault-detecting tool 108 are both components of a Continuous System Telemetry Harness (CSTH). In one embodiment of the present invention, fault-detecting tool 108 performs a Sequential Probability Ratio Test (SPRT) on telemetry signals 106, wherein the SPRT provides a technique for monitoring noisy process variables and detecting the incipience or onset of anomalies in such processes with high sensitivity. Although shown to be outside server 102, telemetry device 104 and fault-detecting tool 108 can both be embedded in server 102 which is being monitored.

Business-dynamic-detecting tool 110 also monitors telemetry signals 106 in real-time. However, instead of looking for anomalies in telemetry signals 106, business-dynamic-detecting tool 110 detects specific dynamic behaviors in the time series of telemetry signals 106 which may be associated with business-sensitive information. If such dynamic behaviors are found in the time series, business-dynamic-camouflaging tool 112 generates artificial activity on server 102 to camouflage the dynamic behaviors in the time series of telemetry signals 106. Although shown to be outside server 102, business-dynamic-detecting tool 110 and business-dynamic-camouflaging tool 112 can both be embedded in server 102.

Note that in FIG. 1, the same telemetry signals 106 feed to both fault-detecting tool 108 and business-dynamic-detecting tool 110. Although FIG. 1 illustrates fault-detecting tool 108 and business-dynamic-detecting tool 110 operating in parallel, they can also operate in sequential order, such that fault-detecting tool 108 is placed before or after business-dynamic-detecting tool 110. Note that, because telemetry signals 106 can include both actual system activity from server 102 and the artificial activity created by business-dynamic-camouflaging tool 112, fault-detecting tool 108 is able to separate actual server activity in telemetry signals 106 from the artificial activity.

Note that in FIG. 1, server 102, telemetry device 104, business-dynamic-detecting tool 110, and camouflaging tool 112 effectively form a feedback and control loop which facilitates detecting and camouflaging business dynamics in telemetry signal 106.

Camouflaging the Telemetry Signals

The present invention camouflages business dynamics in time series of the telemetry signals by using the above-described telemetric feedback and control scheme to generate low-priority activity that "fills in" the load profile of the time series to create a reasonably constant aggregate load.

Figure 2:
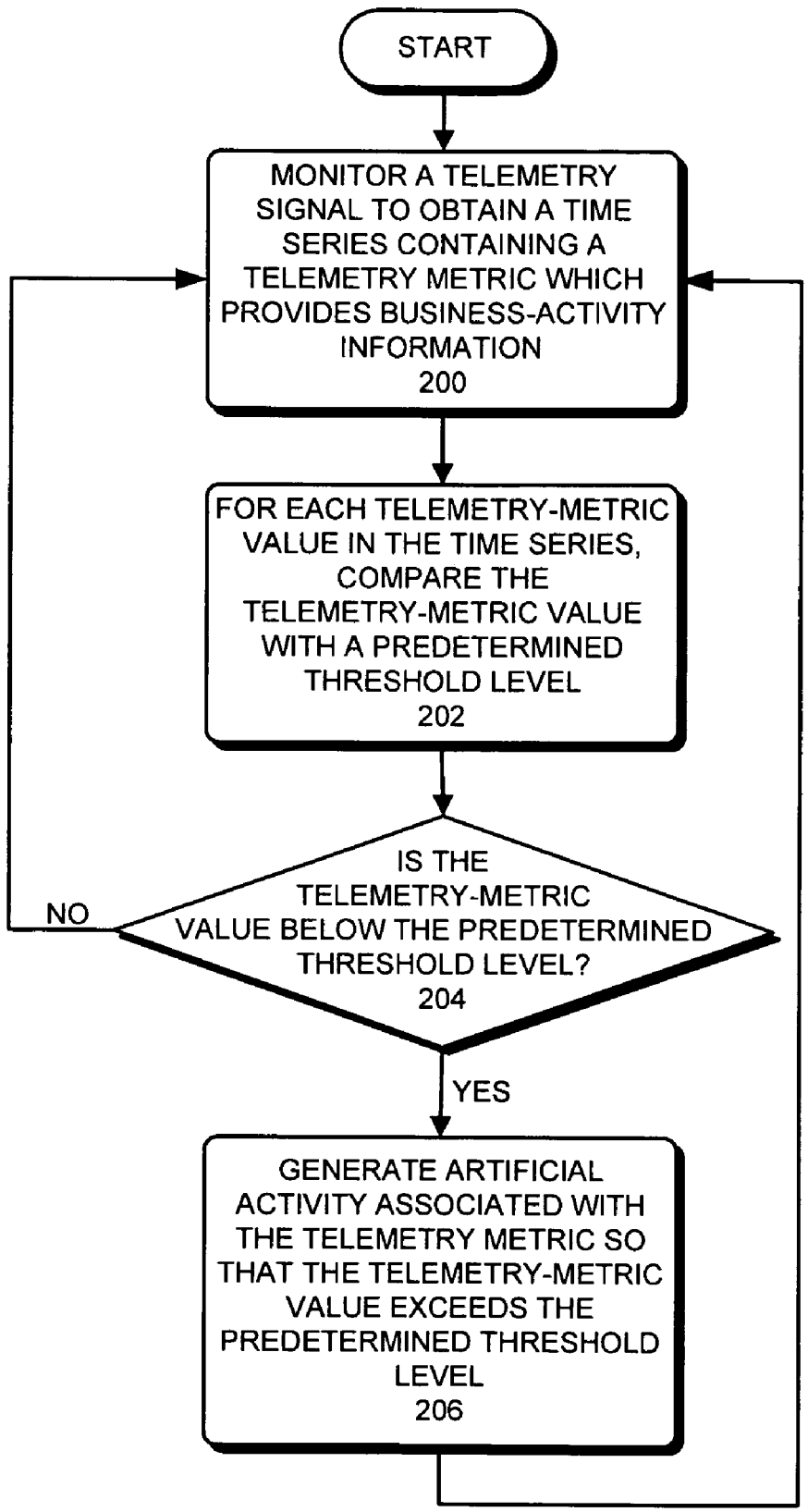
FIG. 2 presents a flowchart illustrating the process of camouflaging business-activity information in telemetry signals from a computer system in accordance with an embodiment of the present invention.

More specifically, FIG. 2 presents a flowchart illustrating the process of camouflaging business-activity information in telemetry signals from a computer system in accordance with an embodiment of the present invention.

During operation, the system monitors a telemetry signal from the computer system to obtain a time series containing a telemetry metric which provides business-activity information (step 200). Note that the telemetry metric can include, but is not limited to: load on the CPU, I/O traffic, memory utilization, and storage read/write activity. These telemetry metrics are likely to reflect the level of the company's business activities, such as booking, billing, shipping and other transactions. In one embodiment of the present invention, the telemetry signal is directly linked with a telemetry metric, for example, the load on the CPU can be directly measured from the CPU. In another embodiment of the present invention, the telemetry signal is indirectly associated with a telemetry metric so the telemetry metric has to be derived from the time series. For example, by monitoring patterns in the core temperature of the CPU, one may be able to infer the load on the CPU.

Next, for each telemetry-metric value in the time series, the system compares the telemetry-metric value with a predetermined threshold level (step 202). For example, if the telemetry metric is the load on the CPU, the predetermined threshold level is a percentage of utilization of the CPU.

The system subsequently determines if the telemetry-metric value is below the predetermined threshold level (step 204). If so, the system generates artificial activity associated with the telemetry metric in the computer system, so that the artificial activity causes the telemetry-metric value to increase and to exceed the predetermined threshold level (step 206). In one embodiment, the artificial activity causes the telemetry-metric value to increase to a predetermined constant value which is above the predetermined threshold. Note that the system performs real-time camouflaging operations for each value in the time series continuously.

For example, if the system detects that the load on the CPU is low, the system generates artificial load on the CPU which causes the corresponding metric value to increase to a relatively high and constant level, thereby "camouflaging" any business-activity information in the original time series.

In addition to the load on CPU, I/O traffic is also closely monitored. If the I/O traffic is below a predetermined threshold, artificial I/O traffic is generated so that bandwidth utilization stays high and relatively constant with time. However, artificial I/O traffic should be kept within a predetermined limit to ensure that it will not be so high to cause congestion and delay for normal customer I/O traffic.

In one embodiment of the present invention, the artificial activity is generated by an exerciser code running on the computer system at a low-priority level. More specifically, the exerciser code uses the received telemetry-metric values as feedback, and generates load, I/O activity, memory requests, and storage activity accordingly. The priority-level for the exerciser code is set sufficiently low so that the execution of the exerciser code will not interfere with user activity, and is halted when such user activity is detected. For example, in a server running on the UNIX operating system, the priority-level can be set at a "nice value" of +19 (i.e., lowest priority), so that if any customer activity is suddenly initiated, the exerciser activity is instantly displaced.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for camouflaging business-activity information in telemetry signals from a computer system, comprising:
    monitoring telemetry signals from the computer system to obtain a time series containing a telemetry metric which provides business-activity information;
    for each telemetry-metric value contained in the time series,
        comparing the telemetry-metric value with a predetermined threshold level; and
        if the telemetry-metric value is below the predetermined threshold level, generating artificial activity associated with the telemetry metric in the computer system, so that the artificial activity causes the telemetry-metric value to exceed the predetermined threshold level.

2. The method of claim 1, wherein the telemetry metric can include:
    load on a CPU;
    I/O traffic;
    memory utilization; and
    storage read/write activity.

3. The method of claim 1, wherein by generating artificial activity associated with the telemetry metric, the method causes the telemetry-metric value to increase to a predetermined constant value.

4. The method of claim 1, wherein the artificial activity is generated by running exerciser code on the computer system at a low-priority level.

5. The method of claim 4, further comprising halting the execution of the exerciser code when user activity is detected.

6. The method of claim 1, wherein the method is performed in a feedback and control loop.

7. A computer-readable storage medium storing instructions that when executed by a computer cause the computer to perform a method for camouflaging business-activity information in telemetry signals from a computer system, the method comprising:
    monitoring telemetry signals from the computer system to obtain a time series containing a telemetry metric which provides business-activity information;
    for each telemetry-metric value contained in the time series,
        comparing the telemetry-metric value with a predetermined threshold level; and
        if the telemetry-metric value is below the predetermined threshold level, generating artificial activity associated with the telemetry metric in the computer system, so that the artificial activity causes the telemetry-metric value to exceed the predetermined threshold level.

8. The computer-readable storage medium of claim 7, wherein the telemetry metric can include:
    load on a CPU;
    I/O traffic;
    memory utilization; and
    storage read/write activity.

9. The computer-readable storage medium of claim 7, wherein by generating artificial activity associated with the telemetry metric, the method causes the telemetry-metric value to increase to a predetermined constant value.

10. The computer-readable storage medium of claim 7, wherein the artificial activity is generated by running exerciser code on the computer system at a low-priority level.

11. The computer-readable storage medium of claim 10, wherein the method further comprises halting the execution of the exerciser code when user activity is detected.

12. The computer-readable storage medium of claim 7, wherein the method is performed in a feedback and control loop.

13. An apparatus that camouflages business-activity information in telemetry signals from a computer system, comprising:
    a monitoring mechanism configured to monitor telemetry signals from the computer system to obtain a time series containing a telemetry metric which provides business-activity information;
    a comparison mechanism configured to compare each telemetry-metric value contained in the time series with a predetermined threshold level; and
    a generating mechanism configured to generate artificial activity associated with the telemetry metric in the computer system, so that the artificial activity causes the telemetry-metric value to exceed the predetermined threshold level if the telemetry-metric value is below the predetermined threshold level.

14. The apparatus of claim 13, wherein the telemetry metric can include:
    load on a CPU;
    I/O traffic;
    memory utilization; and
    storage read/write activity.

15. The apparatus of claim 13, wherein the generating mechanism is further configured to cause the telemetry-metric value to increase to a predetermined constant value if the telemetry-metric value is below the predetermined threshold level.

16. The apparatus of claim 13, wherein the generating mechanism is configured to generate the artificial activity by running exerciser code on the computer system at a low-priority level.

17. The apparatus of claim 16, wherein the generating mechanism is configured to halt the execution of the exerciser code when user activity is detected.

18. The apparatus of claim 13, wherein the method is performed in a feedback and control loop.

* * * * *